United States Patent
Arai et al.

(10) Patent No.: US 6,204,769 B1
(45) Date of Patent: Mar. 20, 2001

(54) BATTERY CONTROL SYSTEM FOR ELECTRIC AUTOMOBILES

(75) Inventors: Yoichi Arai; Kenichi Shimoyama, both of Shizuoka-ken; Toshifumi Maemoto, Hiroshima-ken, all of (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/199,420

(22) Filed: Nov. 25, 1998

(30) Foreign Application Priority Data

Nov. 28, 1997 (JP) .................................................. 9-328626

(51) Int. Cl.⁷ .................................................. G08B 21/00
(52) U.S. Cl. .......................... 340/632; 340/438; 340/455; 454/75; 320/104; 180/65.1
(58) Field of Search .................................... 340/438, 455, 340/632; 204/228.2, 228.4; 454/75; 180/65.1; 320/104

(56) References Cited

U.S. PATENT DOCUMENTS

| | | | |
|---|---|---|---|
| 5,132,663 | * | 7/1992 | Strobl .................................... 340/438 |
| 5,490,572 | * | 2/1996 | Tajiri et al. ........................... 180/65.1 |
| 5,596,261 | * | 1/1997 | Suyama ................................. 320/48 |

FOREIGN PATENT DOCUMENTS

| | | |
|---|---|---|
| 6-217412 | 8/1994 | (JP) . |
| 6-295750 | 10/1994 | (JP) . |
| 8-186901 | 7/1996 | (JP) . |
| 9-45376 | 2/1997 | (JP) . |

* cited by examiner

*Primary Examiner*—Julie Lieu
(74) *Attorney, Agent, or Firm*—Finnegan, Henderson, Farabow, Garrett & Dunner, L.L.P.

(57) ABSTRACT

A hydrogen detector detects a concentration of hydrogen gas in an enclosed space communicating with an accommodation space for accommodating a battery, a hydrogen gas expeller is operative for expelling hydrogen gas from the enclosed space, a controller responds to a concentration of hydrogen gas detected by the detector, as the detected concentration exceeds a lower significant concentration, to provide a control signal for driving the expeller, an alarm system is operative for providing an alarm on an abnormal concentration of hydrogen gas, and another controller responds to the concentration of hydrogen gas detected by the detector, as the detected concentration exceeds a higher significant concentration, to provide a control signal for driving the alarm system.

15 Claims, 6 Drawing Sheets

| ITEMS | H₂ CONC. | FUNCTIONS |
|---|---|---|
| 1ST SET CONC. | 6000ppm | EXPEL BY FUN |
| 2ND SET CONC. | 10000ppm | TURN ON ALARM LAMP |
| CANCEL CONC. | 2000ppm | TURN OFF FAN & ALARM LAMP |

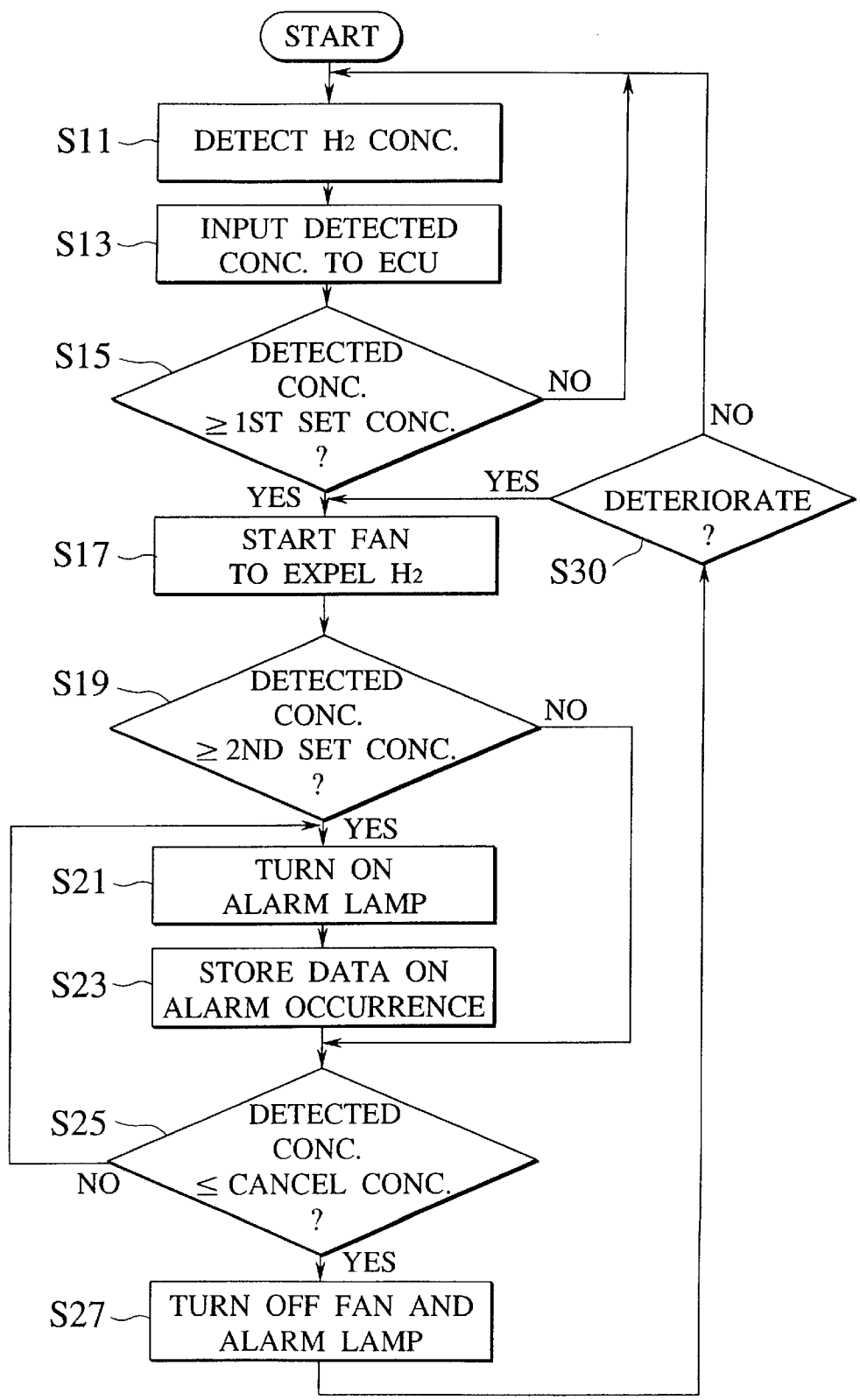

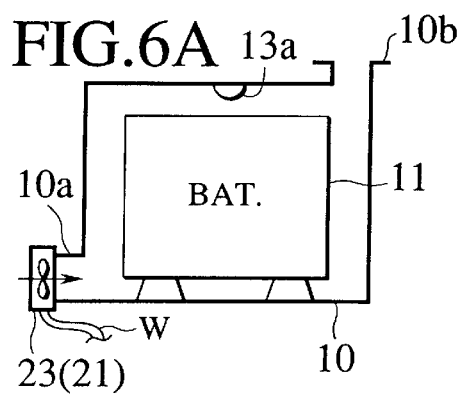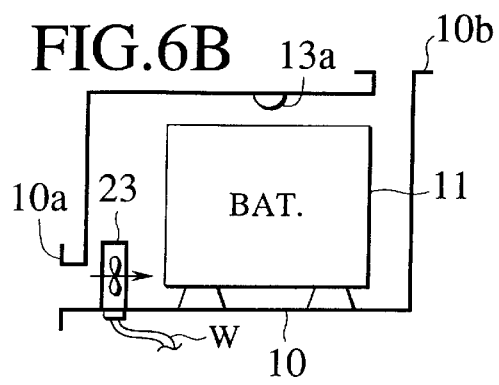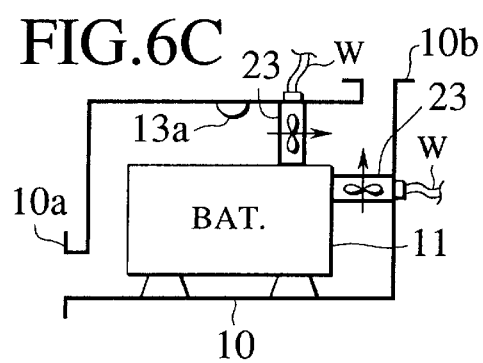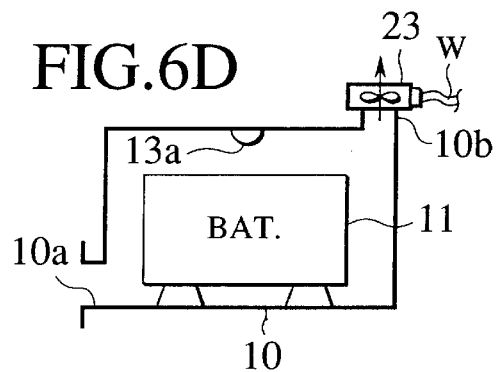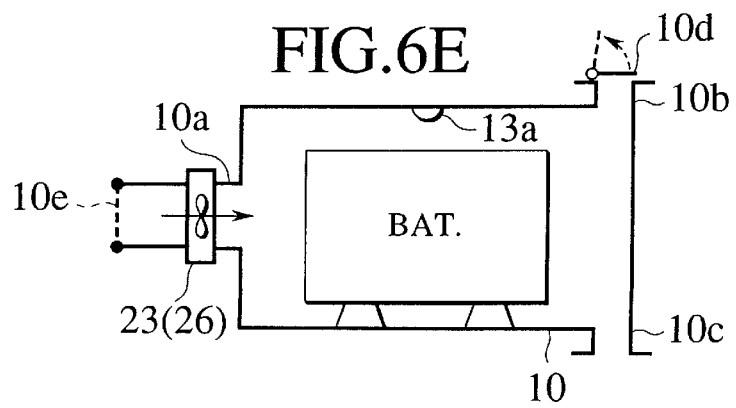

BATTERY CONTROL SYSTEM FOR ELECTRIC AUTOMOBILES

BACKGROUND OF THE INVENTION

1. Field of the Invention

The present invention generally relates to a battery control system for electric automobiles, and particularly, to a battery control system for controlling a battery of an electric automobile to cope with a significant generation of hydrogen from the battery that may occur upon a charge or discharge of the battery or with a deterioration of the battery.

2. Description of Relevant Art

In the electric automobile, a battery for a strong current service is charged from a charger and, after the charge, supplies a voltage to a motor as a load, conducting a discharge current to rotate the motor so that the automobile can travel. As the automobile travels, a remaining capacity of the battery decreases and, in due course, goes below a predetermined value for a battery controller to give an alarm for prevention of an over-discharge, while controlling the charger to re-charge the battery.

The electric automobile may run down a decline, where an acceleration pedal may be released, then the motor works as a generator that provides a restoration current. The battery is charged with the restoration current, and the battery controller controls a voltage across the battery to avoid an over-charge.

The battery for strong current service may be a lead cell or a nickel hydrogen cell, and has a tendency to generate hydrogen when brought into an over-charge or over-discharge condition. Generated hydrogen may have an undesirable concentration, as it ascends and may be accumulated under a top of an associated enclosure that may communicate with a passenger room of the automobile, in which air may become hydrogen-rich to an undesirable degree.

To avoid such a hydrogen-rich state, Japanese Patent Application Laid-Open Publication No. 8-186901 has disclosed a conventional system which checks a battery voltage to detect an over-charge state and an over-discharge state, and responds to a thus detected state to drive a fan for ventilation of an automobile.

However, the battery has a long life and experiences repeated charge-to-discharge cycles. The battery ages and may deteriorate with an increased frequency of charge-to-discharge cycle, with a probable tendency to generate hydrogen when the battery is charged or discharges in an ordinary manner free of over-charge or over-discharge. In the conventional system, as the fan is driven in response to a detected overcharge or over-discharge, the automobile may have an increasing amount of hydrogen stagnant therein.

The battery may enter an abnormal state with an increasing or continued tendency to generate hydrogen, or may suffer from an irregular command of charge and/or discharge control with which the battery may generate a great amount of hydrogen, and a driver may want to be informed of a sign of such abnormality, so that he or she can take adequate measures.

SUMMARY OF THE INVENTION

The present invention has been achieved with such points in view.

It therefore is an object of the present invention to provide a system which can expel a hydrogen-rich atmosphere from an enclosed space of an electric automobile, such as in a battery enclosure or a power train carrier or passenger room communicable therewith, to hold a hydrogen gas concentration in the enclosed space under a significant level even if the battery has a tendency to generate hydrogen gas in an ordinary service, and which can immediately inform a driver of a detected abnormal concentration of hydrogen gas in the enclosed space, due such as to an abnormal state of the battery or of charge and discharge controls.

To achieve the object, a first aspect of the invention provides a battery control system for electric automobiles, comprising a detector for detecting a concentration of hydrogen gas in an enclosed space communicating with an accommodation space for accommodating a battery for driving an electric automobile, an expeller for expelling hydrogen gas from the enclosed space, a first controller for responding to the concentration of hydrogen gas detected by the detector, as the detected concentration exceeds a first significant concentration, to provide a first control signal for driving the expeller, an alarm provider for providing an alarm on an abnormality of concentration of hydrogen gas in the electric automobile, and a second controller for responding to the concentration of hydrogen gas detected by the detector, as the detected concentration exceeds a second significant concentration higher than the first significant concentration, to provide a second control signal for driving the alarm provider.

According to the first aspect, in a battery control system for electric automobiles, a detector for hydrogen concentration detection detects a concentration of hydrogen gas in an enclosed space communicating with an accommodation space for accommodating a battery for an electric automobile to be thereby powered to travel, as the battery is charged and discharges and may generate hydrogen gas. An expeller is adapted to expel hydrogen gas from the enclosed space, as a device for a forced draft or diffusion of hydrogen gas that may be generated from the battery. A first controller, which may have input thereto a value of a concentration detected by the detector and make decision as to whether or not the detected concentration value is equal to or larger than a value of a predetermined first significant concentration, responds to the concentration of hydrogen gas detected by the detector, as the detected concentration exceeds the first significant concentration, to provide the expeller with a first control signal as a drive signal for driving the expeller. An alarm provider or an alarm system is adapted to provide an alarm on an abnormality of concentration of hydrogen gas in the electric automobile, that may be in terms of a rate of the generation of hydrogen gas. A second controller, which may make decision as to whether or not the detected concentration value is equal to or larger than a value of a predetermined second significant concentration higher than the first significant concentration, responds to the concentration of hydrogen gas detected by the detector. as the detected concentration exceeds the second significant concentration, to provide the alarm provider or system with a second control signal as an alarm signal for driving the alarm provider or system.

Accordingly, an expeller is driven with a first control signal given, and an enclosed space has a lowered concentration of hydrogen gas. Even if hydrogen gas is generated from a battery in a normal charge or discharge action, as the battery may be deteriorated, or upon a temporal generation of hydrogen gas due to a sudden acceleration or deceleration for example, generated hydrogen gas is expelled and prevented such as from accumulation in the space that may be a passenger room, without an alarm to a driver, who is thus kept free from extra anxieties, when driving.

In addition, an alarm provider or system is driven with a second control signal given, for a warning of an abnormal generation of hydrogen gas to a driver and passenger(s), who can thus be immediately informed of a generation of a great amount of hydrogen gas duc to abnormality such as of a battery or at a charge and/or discharge control system and can take adequate measures.

According to a second aspect of the invention, the battery control system further comprises a third controller for responding to the concentration of hydrogen gas detected by the detector, as the detected concentration is lower than a third significant concentration lower than the first significant concentration, to provide a third control signal for canceling the first and second control signals.

According to the second aspect, a third controller, which may make a decision as to whether or not a value of a concentration of hydrogen gas detected by a detector is equal to or smaller than a value of a predetermined third significant concentration lower than a first significant concentration, responds to the concentration of hydrogen gas detected by the detector, as the detected concentration is lower than the third significant concentration, to provide a third control signal for canceling the first and second control signals. The third control signal may be input to first and second controllers to stop outputting first and second control signals.

Accordingly, an expeller stops expelling hydrogen gas, and an alarm provider or system stops giving alarms of an abnormal generation of hydrogen gas, whereby a driver is informed of an eliminated abnormality.

According to a third aspect of the invention, the battery control system further comprises a memory for storing a record of the alarm in response to the second control signal.

According to the third aspect, a memory is provided for storage of data, and a second controller may store in the memory an alarm occurrence data representative of an occurrence of an alarm when an alarm provider or system gives an alarm on abnormality of generation of hydrogen gas.

Accordingly, simply by a storage of an alarm occurrence data in a memory, a driver is allowed to know an occurrence of abnormal generation of hydrogen gas in past.

According to a fourth aspect of the invention, the second controller is adapted, when an ignition key of the electric automobile is operated, to check the memory for a stored record of the alarm and respond to the stored record to provide the second control signal.

According to the fourth aspect, when an ignition key is operated or an ignition signal is turned on, a second controller checks a memory for a stored record of an alarm, by reading an alarm occurrence data stored in the memory for example, and responds to the stored record to provide a second control signal, which is output to an alarm provider or system, which gives an alarm of an abnormal generation of hydrogen gas that might have occurred during a charge.

According to a fifth aspect of the invention, the battery control system further comprises a controller for responding to a deterioration of the battery to provide a control signal for driving the expeller.

According to the fifth aspect, a controller, which may detect a deterioration of a battery, e.g. by comparing a charge frequency with a criterion, responds to the deterioration of the battery to provide a control signal for driving an expeller, so that the battery can provide a comfortable long-term service.

According to a sixth aspect of the invention, the expeller comprises an anti-explosive fan installed in the enclosed space.

According to the sixth aspect, an anti-explosive fan, which may belong to a relatively low anti-explosion class and may be inexpensive as a drive part may be separated, is installed in an enclosed space to expel hydrogen gas from the space.

According to a seventh aspect of the invention, the expeller comprises a fan installed outside the enclosed space.

According to the seventh aspect, an inexpensive fan provides a forced draft for expelling hydrogen gas from an enclosed space.

According to an eighth aspect, the expeller comprises a fan operative for air-cooling the battery.

According to the eighth aspect, a battery can be cooled with a fan operative to expel hydrogen. Fan revolutions per unit time may be different between cooling and expelling services.

According to a ninth aspect of the invention, the battery control system further comprises a charge system for charging the battery, and a controller for controlling the charge system to prevent over-charging the battery.

According to the ninth aspect a battery control is linked with a hydrogen concentration control, so that the battery control may have an extended allowance or tolerance, permitting a facilitated service for battery charge, as an expeller is operative.

Further, to achieve the object described, a tenth aspect of the invention provides a hydrogen concentration control system for electric automobiles, comprising a detector for detecting a concentration of hydrogen gas in an enclosed space communicating with an accommodation space for accommodating a battery for driving an electric automobile, an expeller for expelling hydrogen gas from the enclosed space, a first controller for responding to a concentration of hydrogen gas detected by the detector, as the detected concentration exceeds a first significant concentration, to provide a first control signal for driving the expeller, an alarm provider for providing an alarm on a concentration of hydrogen gas in the electric automobile, and a second controller for responding to the concentration of hydrogen gas detected by the detector, as the detected concentration exceeds a second significant concentration higher than the first significant concentration, to provide a second control signal for driving the alarm provider.

According to the tenth aspect, like effects to the first aspect will be achieved without considerations to a battery control.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 5 is a flowchart of control actions of a battery control system according to an embodiment of the invention;

FIGS. 6A to 6E are schematic sections of battery enclosures of battery control systems according to embodiments of the invention, respectively.

DETAILED DESCRIPTION OF THE PREFERRED EMBODIMENTS

Figure 1:
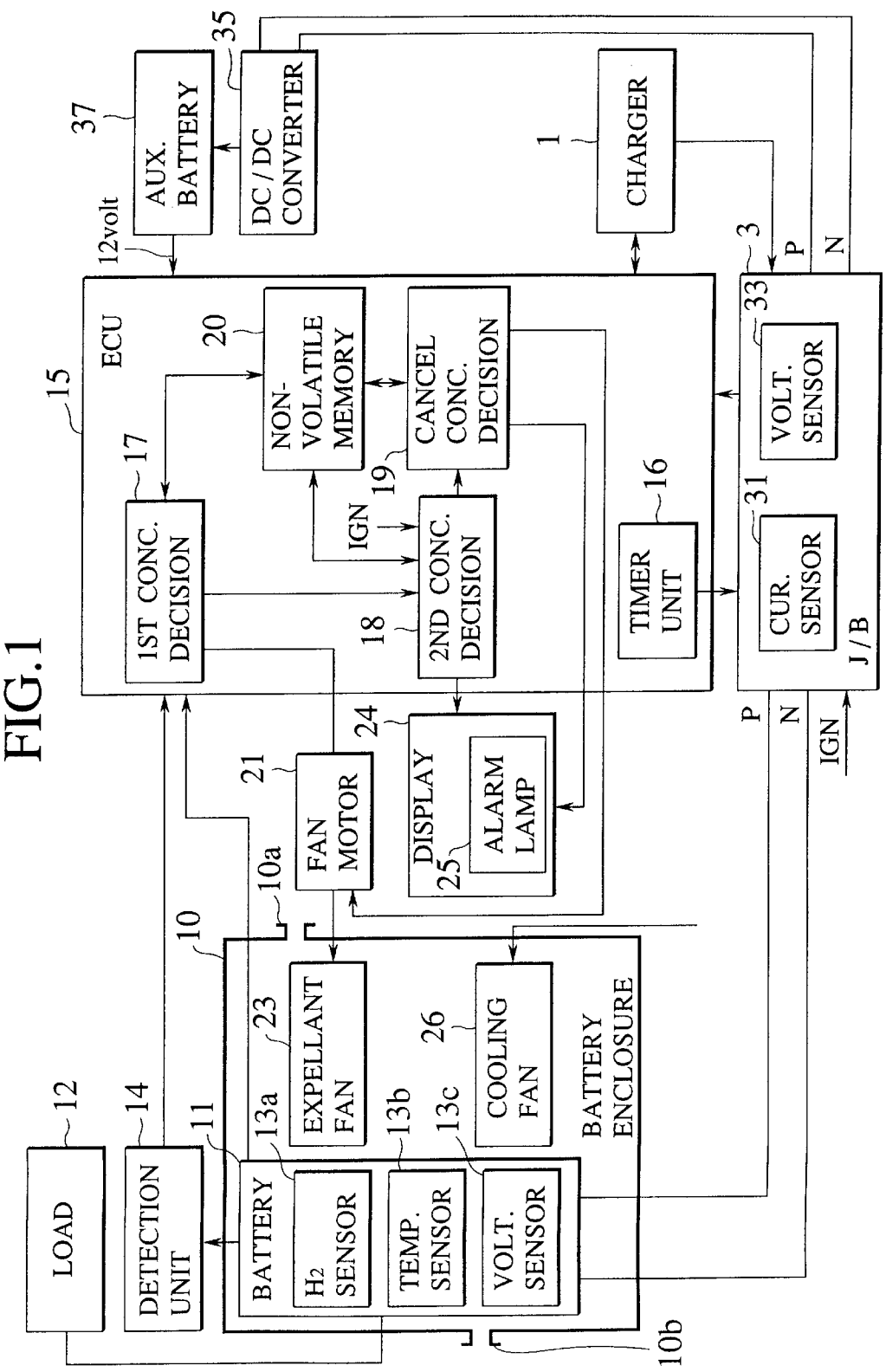
FIG. 1 is a block diagram of a battery control system in an electric automobile according to an embodiment of the invention.

There will be detailed below the preferred embodiments of the present invention with reference to the accompanying drawings. Like members are designated by like reference characters.

FIG. 1 shows a battery control system for an electric automobile according to an embodiment of the invention, which system has an array of modules of secondary cells or an array of secondary cells (hereafter collectively called "battery") 11 for powering a drive motor as a load 12 of the electric automobile, an electronic control unit (hereafter called "ECU") 15 for outputting control signals depending on input data thereto which include detection data on operational and working conditions of the battery 11, and implements for controlling the operational and working conditions of the battery 11 by physical and/or chemical actions thereto in accordance with control signals from the ECU 15. More specifically, the ECU 15 constitute part of a set of files or programs read to be processed in a CPU (central processing unit, not shown) that works as a supervising controller for the system. Interfaced data and signals to and from the ECU 15 are each subjected to a processing by the CPU, which will however be omitted for convenient description, unless otherwise described.

Working conditions to be normally monitored include an amount of hydrogen generated from the battery 11 in terms of a ppm (parts per million) concentration of particles of hydrogen molecule and/or hydrogen atom or ion (collectively called "hydrogen gas" as used herein), as it is detected by a hydrogen sensor (having an effective sensing point) 13a near a top of a battery accommodating cavity in an enclosure 10 of the battery 11. The effective sensing point (13a) denotes a representative one of sensing points where hydrogen should be detected, if any, directly or indirectly. In other words, a direct or indirect sensing element (13a) may be located within a top central region of the cavity in the battery enclosure 10, or detection values may be collected from a plurality of direct or indirect sensing elements (13a) located in or near gas outlets of containers of battery modules or cells and processed as hydrogen gas generation data to provide an estimated concentration value of hydrogen gas in the top central region. The battery enclosure 10 is fixed or integrated to one of a roof portion, a longitudinally or transversely one-sided portion, and a bottom portion of a body of the electric automobile, i.e., to a vehicle body portion about a passenger room of the electric automobile.

As shown in FIG. 1, the battery 11 is placed (on and fastened or secured to a bottom) in the enclosure 10, and is charged with a charge current supplied from an external charger 1 through an electric junction box (hereafter called "J/B") 3. As the battery 11 is charged (or restored) and discharges, hydrogen gas is generated therefrom at a rate corresponding to a charge frequency and a quantity of associated electric charges, and the battery enclosure 11 has an increasing amount of hydrogen gas accumulated therein, which gas naturally diffuses to drift away in due course and/or is forced or let outside the enclosure 10 that has an air inlet 10a, an air outlet 10b, and a battery cooling fan 26. The battery 11 may provide a frequent service over a long term, with a potential generation of hydrogen gas exceeding a significant concentration under a critical concentration of hydrogen gas. To this point, the battery enclosure 10 is provided with an atmosphere expellant fan 23 as an air ventilator of an anti-explosive structure.

The battery 11, which may be a lead storage battery, is charged from the charger 1 as described, and imposes a voltage across the drive motor (as the load) 12 of the electric automobile, supplying a discharge current to the motor 21, so that the motor 12 rotates, driving the automobile to travel. The battery 11 thus repeats charge and discharge actions, generating hydrogen gas. The battery 11 may have a serial connection of 12V modules or cells, and may have an approx. 300V capacity for a strong current service.

The battery 11 is provided with a set of condition detectors including the hydrogen sensor 13a, a temperature sensor 13b, and a voltage sensor 13c. The hydrogen sensor 13a detects a value of concentration of hydrogen gas in an atmosphere containing hydrogen gas generated from the battery 11, and a detected concentration value is output to the ECU 15.

The temperature sensor 13b detects a temperature of the battery 11, and a detected temperature value is output to the ECU 15. The voltage sensor 13c comprises an array of voltmeters each provided for, and detecting a terminal voltage across, a corresponding battery module or cell in the battery 11. Each voltmeter may be directly connected to the ECU 15 by a dedicated signal line for outputting a detected voltage value to the ECU 15.

Each sensor may also be connected to the ECU 15 by a dedicated signal line for outputting the detected value(s) to the TCU 15. In the embodiment of FIG. 1, respective detection values detected at the hydrogen sensor 13a, temperature sensor 13b and voltage sensor 13c are collected at a detection unit 14, where they are combined into a time-division multiplex signal to be transmitted by an optical fiber or the like to the ECU 15.

The J/B 3 includes a current sensor 31 and a voltage sensor 33. The current sensor 31 detects an electric current conducted from the battery 11 to the load 12, and a detected current value is output to the ECU 15. The voltage sensor 33 detects a terminal voltage across the battery 11, i.e. between both ends of the serial connection of the battery modules or cells, and a detected voltage value is output to the ECU 15. P denotes a positive pole, and N, a negative pole. An ignition key operation signal IGN is input to the J/B 3, and is output therefrom to the ECU 15.

The ECU 15 serves as a battery controller, which is responsive to any combination of a battery voltage value from the voltage sensor 33 and module or cell voltage values from the voltage sensor 13c, to control the charger 1 depending thereon, as well as to make decisions such as for the battery 11 to be normal or not. The ECU 15 further responds to a temperature value from the temperature sensor 13c to make a decision for the battery temperature to be normal or not. If the battery temperature abnormally rises, the ECU 15 drives a motor (not shown) of the cooling fan 26 to be rotated for air-cooling the battery 11.

The ECU 15 is responsive to a hydrogen concentration value from the hydrogen sensor 13a, to make decisions for the hydrogen concentration to be normal or abnormal to any of predetermined degrees, and has a first concentration decision section 17, a second concentration decision section 18, a cancellation concentration decision section 19, and a non-volatile memory 20.

The decision sections 17, 18 and 19 are supposed to be functions, as they are executed by control programs read from a ROM (read-only memory) to the CPU.

The non-volatile memory 20, which may be an EPROM (erasable programmable read-only memory) holding stored contents even when powered off, has stored therein a first predetermined concentration value, a second predetermined concentration value larger than the first concentration value, and an expelling-cancellation concentration value as a third predetermined concentration value smaller than the first concentration value.

Figures 3, 4:
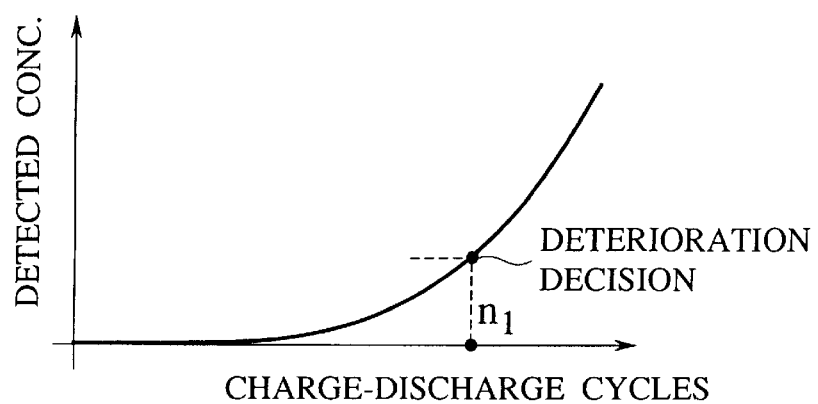
FIG. 3 is a table of predetermined concentration values and associated functions of the system of FIG. 1.
FIG. 4 is a diagram describing a criterion for a decision on a deterioration of a battery, in a battery control system according to an embodiment of invention.

FIG. 3 exemplifies a table of predetermined concentration values, in which a hydrogen concentration of 6000 ppm is given as the first concentration value for example. Unless the detected concentration value is smaller than the first concentration value, the ECU 15 executes a function thereof for driving the fan 23 to expel hydrogen gas out of the enclosure 11.

A hydrogen concentration of 10000 ppm is given as the second concentration value for example. Unless the detected concentration value is smaller than the second concentration value, the ECU 15 executes a function thereof to turn an alarm lamp 25 on. A hydrogen concentration of 2000 ppm is given as the cancellation concentration value for example. Unless the detected concentration value is larger than the cancellation concentration value, the ECU 15 executes a function thereof to stop the fan 23 and turn the alarm lamp 25 off.

The first concentration decision section 17 reads the first concentration value from the non-volatile memory 20, makes a decision on whether or not the value of concentration detected by the hydrogen sensor 13a is equal to or larger than the first concentration value, and responds to a detected concentration equal to or larger than the first concentration value to output a drive signal to a fan motor 21 for driving the fan 23. The fan motor 21 and the fan 23 constitute a hydrogen gas expeller.

The second concentration decision section 18 reads the second concentration value from the non-volatile memory 20, makes a decision on whether or not the value of concentration detected by the hydrogen sensor 13a is equal to or larger than the second concentration value, and responds to a detected concentration equal to or larger than the second concentration value to output an alarm signal to a display section 24 including the alarm lamp 25, so that the alarm lamp 25 turns on. The display section 24 may display a temperature abnormality of the battery 11, an abnormality of a respective battery module or cell, a digital remaining capacity of the battery 11, and a reduction of the remaining capacity, in accordance with signals from the ECU 15.

The cancellation concentration decision section 19 reads the cancellation concentration value from the non-volatile memory 20, makes a decision on whether or not the value of concentration detected by the hydrogen sensor 13a is equal to or smaller than the cancellation concentration value, and responds to a detected concentration equal to or smaller than the cancellation concentration value to stop outputting the drive signal to the fan motor 21, thereby stopping the fan 23, and to stop outputting the alarm signal to the display section 24, thereby turning the alarm lamp 25 off.

The J/B 3 includes a capacitor (not shown) of a large capacity for storing electric charges from the battery 11, which are discharged by a timing depending on a timing signal from a timer unit 16 in the ECU 15. A discharge voltage of approx. 300V (for strong current service) is converted by a DC/DC converter 35 into a 12V supply (for weak current service), which is fed to an auxiliary battery 37, which provides the ECU 15 with a 12V supply.

Figure 2:
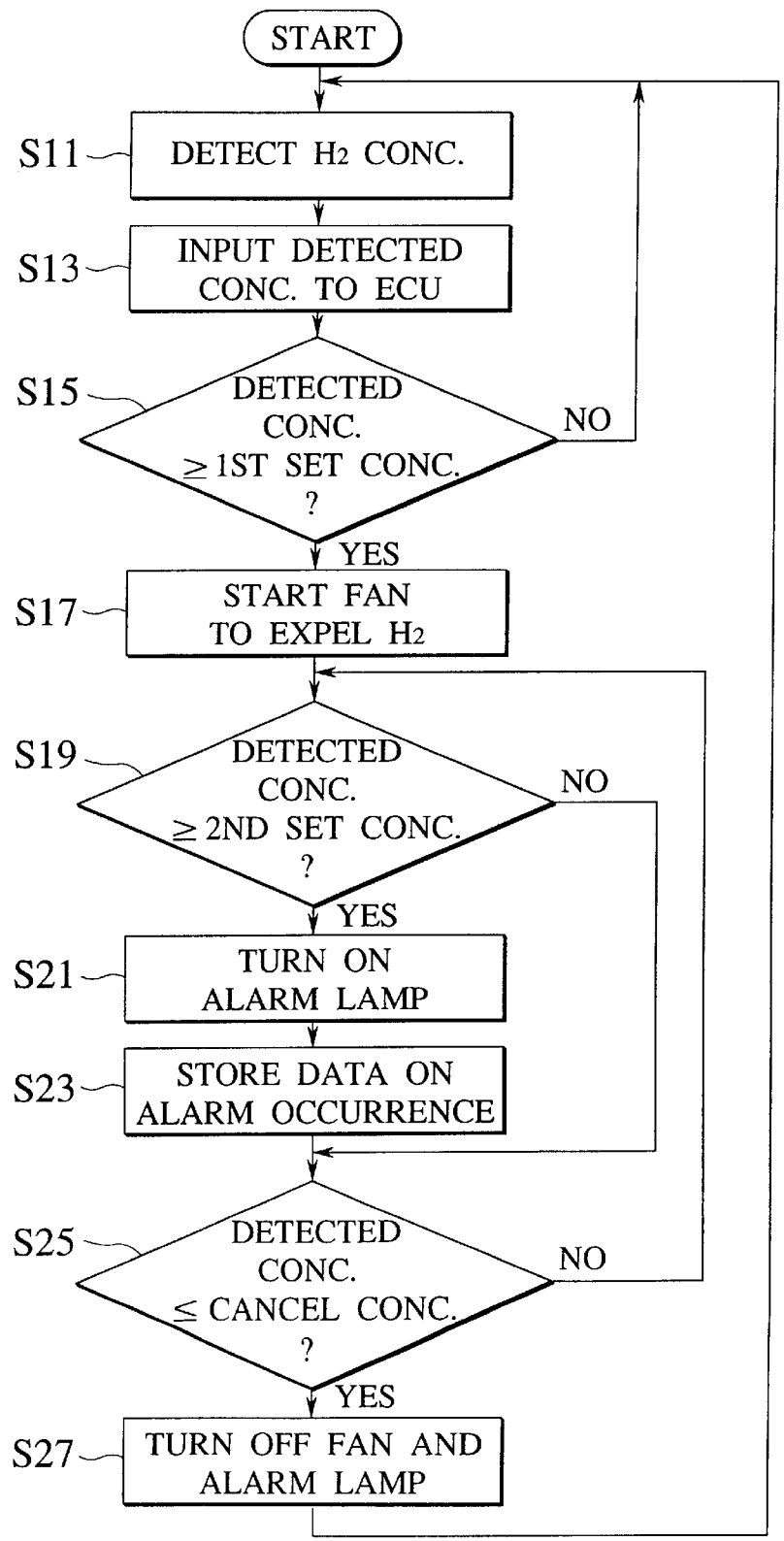
FIG. 2 is a flowchart of control actions of the system of FIG. 1.

FIG. 2 shows a control flow of the ECU 15, which starts with an input start signal that may be triggered by the ignition signal IGN.

The battery 11 is now charged full. An ignition key is operated to an on position, and the drive motor 12 starts rotation in accordance with a drive current discharged from the battery 11. Transmission gears are connected, and acceleration and brake pedals are operated, as necessary. As the electric automobile travels on a road having one or more inclines and one of more declines, the motor 12 may sometimes need an increased discharge current, and sometimes charge (to restore) the battery 11. After a cruising with a battery capacity remaining above empty, the battery 11 may be recharged at a convenient energy station. Along such a travel of the automobile, hydrogen gas is generated from the battery 11 and mixes with a hydrogen-containing atmosphere in the battery enclosure 10, so that at a step S11 (FIG. 2) the hydrogen sensor 13a detects a resultant concentration of hydrogen gas at the top central region in the battery enclosure 10.

At a step S13, the detection value of a concentration detected by the hydrogen sensor 13a is input to the ECU 15. Then, at a step S15, the first concentration decision section 17 reads a preset first concentration value (e.g. hydrogen 6000 ppm) stored in the non-volatile memory 20, and makes a decision as to whether or not the value of concentration detected by the hydrogen sensor 13a is equal to or larger than the first concentration value.

If the detected concentration value is equal to or larger than the first concentration value, the control flow goes to a step S17 for outputting a drive signal to the fan motor 21 to drive the fan 23, so that hydrogen gas generated from the battery 11 is blown out or forced to diffuse, i.e. expelled out of the battery enclosure 10, with a reduced hydrogen concentration about the battery 11.

In the case the detected concentration value is smaller than the first concentration value, the steps between from S11 to S15 will be repeated until the detected value reaches the first concentration value.

At a step S19, the second concentration decision section 18 reads a preset second concentration value (e.g. hydrogen 10000 ppm) stored in the non-volatile memory 20, and makes a decision as to whether or not the value of concentration detected by the hydrogen sensor 13a is equal to or larger than the second concentration value, The second concentration value (e.g. 10000 ppm) is determined to be sufficiently lower than a lower explosion limit (approx. 40000 ppm) of hydrogen gas under an atmospheric pressure at a normal temperature.

If the detected concentration value is equal to or larger than the second concentration value, the control flow goes to a step S21, where the second concentration decision section 18 outputs an alarm signal to the display section 24, where it turns the alarm lamp 25 on. With the alarm lamp 25 on, there is informed an abnormal generation of hydrogen gas.

In the case the detected concentration value is smaller than the second concentration value, the control flow goes to a step S25, so that the step S19 and a step S25 will be repeated until the detected concentration value increases up to the second concentration value or decreases below a preset expelling-cancellation concentration value.

At a step S23, as the alarm lamp 25 is turned on, the second concentration decision section 18 stores in the non-volatile memory 20 an alarm occurrence data representative of an occurrence of an alarmed state by the alarm lamp 25.

At the step S25, the cancellation concentration decision section 19 reads an expelling-cancellation concentration value (e.g. hydrogen 2000 ppm) stored in the non-volatile memory 20, and makes a decision as to whether or not the value of concentration detected by the hydrogen sensor 13a is equal to or smaller than the cancellation concentration value.

If the detected concentration value is equal to or smaller than the cancellation concentration value, the control flow goes to a step S27, where the cancellation concentration decision section 19 stops outputting the drive signal to the fan motor 21, thereby stopping the fan 23, and stops outputting the alarm signal to the display section 24, thereby turning the alarm lamp 25 off.

According to the embodiment described, a battery control system of an electric automobile has two stages of concentration values set in advance, i.e. a predetermined first concentration value and a predetermined second concentration value, and copes with generation of hydrogen gas, as it may be temporal, by driving a hydrogen expellant fan 23 to expel generated hydrogen gas when a concentration of the hydrogen gas exceeds the first concentration value.

The generation of hydrogen gas may be abnormal, i.e., the rate of generation may exceed a ventilation rate by the fan 23 up to a significant rate (e.g. corresponding to hydrogen 10000 ppm) under a critical rate. In this regard, if the concentration of hydrogen gas reaches the second concentration value, an alarm lamp 25 is turned on for a notification of the abnormal generation of hydrogen gas such as to a driver of the electric automobile, permitting countermeasures to be taken well before the hydrogen gas concentration approaches more significant levels under a critical concentration. The display 24 may indicate respective significant levels (e.g. 1000, 2000, 5000, 10000, 15000, 20000, 25000, 30000, 35000 ppm) or regions of hydrogen gas concentration and a critical zone (e.g. over 40000 ppm) in a color coding manner in accordance with commands from an ECU 15.

The expellant fan 23 is driven by a fan motor 21, which may be controlled from the ECU 15 to output a continuously or stepwise varying magnitude of drive torque depending on a significancy of the concentration of hydrogen gas detected by the hydrogen sensor 13a, so that usually generated hydrogen gas can be expelled outside a battery enclosure 10. As the fan 23 works, the detected concentration of hydrogen gas decreases. When the detected concentration value is lowered below a concentration value predetermined as a criterion for a cancellation concentration decision section 19 of the ECU 15 to decide canceling a drive command to the fan motor 21, then the fan 23 is stopped and the alarm lamp 25 is turned off, so that the alarm is interrupted, indicating a restored normal state to be free of abnormal generation of hydrogen gas.

Each occurrence of abnormal generation of hydrogen gas is recorded as an alarm data stored in a non-volatile memory 20, when the occurrence is informed by an alarm section of the system including the alarm lamp 25 and the controls described. Detection data of the hydrogen sensor 13a may be stored in the memory 20, as history data, and the ECU 15 may periodically check the history data for significant levels of abnormal hydrogen gas generation, storing a check record. The ECU 15 controls such data as records on abnormality.

Upon an operation of an ignition key for the next travel, an ignition signal IGN is input to the ECU 15, where a second concentration decision section 18 responds thereto to read the abnormality records stored in the non-volatile memory 20. If the alarm data (more specifically, that during the last travel) is found, an alarm signal is output to the display section 24 to turn the alarm lamp 25 on. Other records on abnormality may also be displayed in a selective manner.

A driver is thus positively re-informed of an occurrence of abnormal generation of hydrogen gas in past, such as at a (restoring) charge during an old travel, as the information is kept stored in the non-volatile memory 20.

In the embodiment described, the battery 11 comprises a set of lead cells, which may preferably be replaced by a set of nickel hydrogen cells. In use of nickel hydrogen cells, the first and second concentration values (e.g. hydrogen 6000 ppm, 10000 ppm) may be set smaller, respectively, as the nickel hydrogen cell has a greater tendency to deteriorate with generation of hydrogen gas.

The lead cell also has a tendency to deteriorate with generation of hydrogen gas, but is less susceptive.

FIG. 4 illustrates a criterion (n1) for a decision on the deterioration of a battery (11), in a battery control system according to an embodiment of the invention. This control system will also be described by using FIG. 1, as it is analogous to the embodiment of FIG. 1 unless otherwise described.

An ECU 15 is given a data on an experience of a charge-to-discharge cycle of the battery 11, as it is input by a driver, and counts the number of times of the cycle over a predetermined term, as it represents a charge frequency of the battery 11 in a practical sense. The ECU 15 may check, while an ignition signal IGN is off, detection data of a current sensor 31 and/or a voltage sensor 13c or 33 for a significant change in polarity or direction of current and/or potential difference, respectively, as it represents a charge to the battery 11, and may increment a charge frequency counter when the ignition signal IGN is turned on, as the significant change has been checked. Or alternately, the ECU 15 may always check for a significant change in polarity or direction of current, as it represents a charge to or restoration of or a discharge from the battery 11, and may count the number of pairs of neighboring significant changes, as a charge frequency in a wide sense.

The battery 11 may serve long, and (like FIG. 4) may have an increased tendency to generate hydrogen gas, as the battery 11 deteriorates with an increased charge frequency. In this regard, a memory 20 has stored therein a data on a significant charge frequency n1 over which the battery 11 may be assumed to be deteriorated so that it can generate hydrogen gas at a significant rate.

FIG. 5 shows a control flow of the present embodiment, which may be a selective mode of the previous embodiment and is different from the control flow of FIG. 2 simply in an action after a negative decision (NO) at a step S25 and in that a decision step S30 is provided after a step S27.

In the control flow of FIG. 5, once a first concentration is reached (YES at a step S15), a hydrogen expellant fan 23 is driven (at a step S17) and an alarm lamp 25 is kept on (by a routine of steps S21, S23 and S25) until a detected concentration value decreases below a cancellation concentration value (YES at step S25), irrespective of a decision on a second concentration value at a step S19. Upon the negative decision NO at the step S25, the control flow may go to the step S19, as in FIG. 2.

At the step S30, the ECU 15 checks if the battery 11 is deteriorated, by comparing a current charge frequency with the significant charge frequency n1. When the current frequency is smaller than the significant frequency n1, the ECU 15 makes a decision (NO at step S30) for the battery 11 to be normal (or not to be deteriorated) and the control flow goes to a step S11 for detecting a concentration of hydrogen gas. Unless the current frequency is smaller than the significant frequency n1, the ECU 15 makes a decision (YES at step S30) for the battery 11 to be deteriorated and the control flow goes to the step S17 for starting the fan 23 to expel hydrogen gas out of the battery enclosure 10.

FIGS. 6A to 6E and 7A and 7B show various fan and sensor arrangements in battery control systems according to embodiments of the invention.

A battery 11 is placed in a box-shaped battery enclosure 10, and fixed to mount members on a bottom wall of the box-shaped enclosure 10. The battery enclosure 10 is installed in a compartment or chamber C in a carrier 50, such as a power train carrier 51 in front of a passenger room R (FIG. 7A) or a battery carrier 61 beneath a passenger room R (FIG. 7B), or fixed to a vehicle chassis of an electric automobile, and is formed with a front (with respect to the automobile) wall, a rear wall, both side walls, a top wall and the bottom wall. The enclosure 10 has a fresh air inlet 10a as a horizontal port formed at a lower end part (FIGS. 6A–6D, 7A–7B) or a vertically middle part (FIG. 6E) of the front wall, an air outlet 10b as a vertical hydrogen gas expelling port formed at a rear end part of the top wall, and a hydrogen gas sensor 13a located in a central region of a downside of the top wall. The inlet 10a and outlet 10b may be employed for guiding battery cooling air.

A hydrogen expellant fan 23 is combined with a drive motor 21 to provide an anti-explosive air ventilator 23(21) (hereafter referred to simply by 23, as well as in FIGS. 6B–6E and 7A–7B) having a rigid frame and a power supply line W provided through a sealed conduit. The fan 23 is installed: outside the enclosure 10, at a front end (FIGS. 6A, 7A–7B) or an intermediate part (FIG. 6E) of the air inlet 10a (provided through a lower end part of a front wall of the carrier 50 in FIGS. 7A–7B) or at an upper end (FIG. 6D) of the air outlet 10b, or inside the enclosure 10, behind a rear end (FIG. 6B) of the air inlet 10a or in way of air flows (FIG. 6C) between the battery 11 and the enclosure 10; outside the carrier 50 (FIGS. 7A–7B), at a rear end of an air outlet 50b or 60b formed at an upper end part of a rear wall of the carrier 50; and inside the passenger room R, near a hydrogen outlet 53B or 63B provided through a roof member 53 or 63. The anti-explosive fan 23 may have an energy storage portion thereof separated to be installed in a safety region. Outside the battery enclosure 10, the fan 23 may not be anti-explosive in structure.

In the embodiment of FIG. 6E, the fan 23 concurrently serves as a battery cooling fan (26), and another air outlet 10c is formed at a rear end part of the bottom wall of the enclosure. The air outlet 10c at the bottom side may be an opening, and the air outlet 10b at the top side may have a normally close valve 10d controlled to be open for expelling hydrogen gas. For clean air supply to the battery 11, an air cleaning mesh 10e is provided at a front end of the air inlet 10a.

Figure 7A:
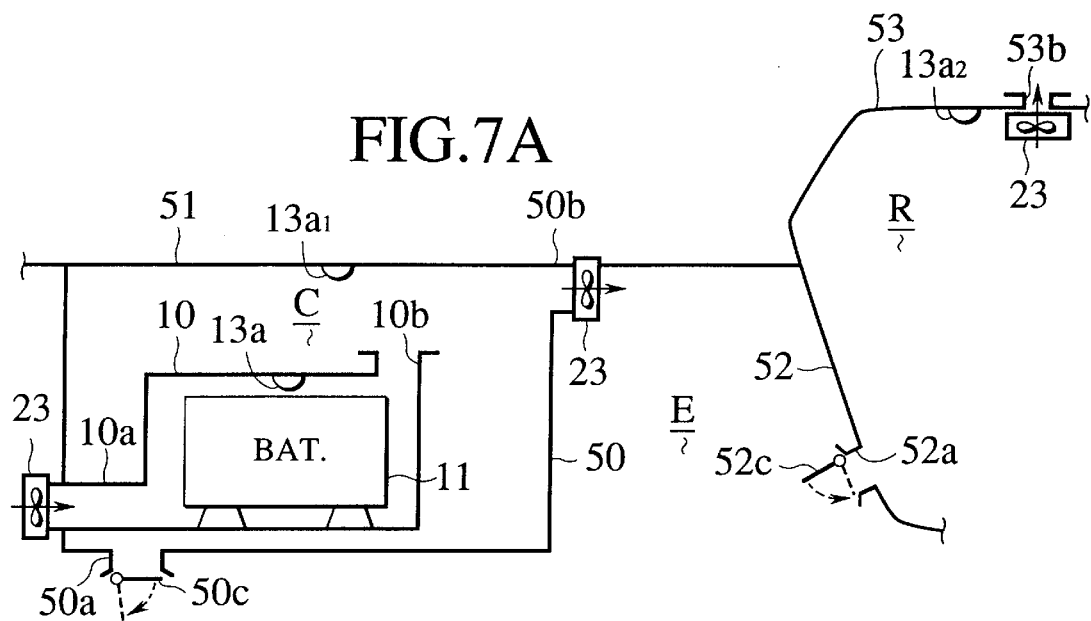
FIGS. 7A and 7B are schematic fragmentary sections of electric automobiles equipped with battery control systems according to embodiments of the invention, respectively.
Figure 7B:
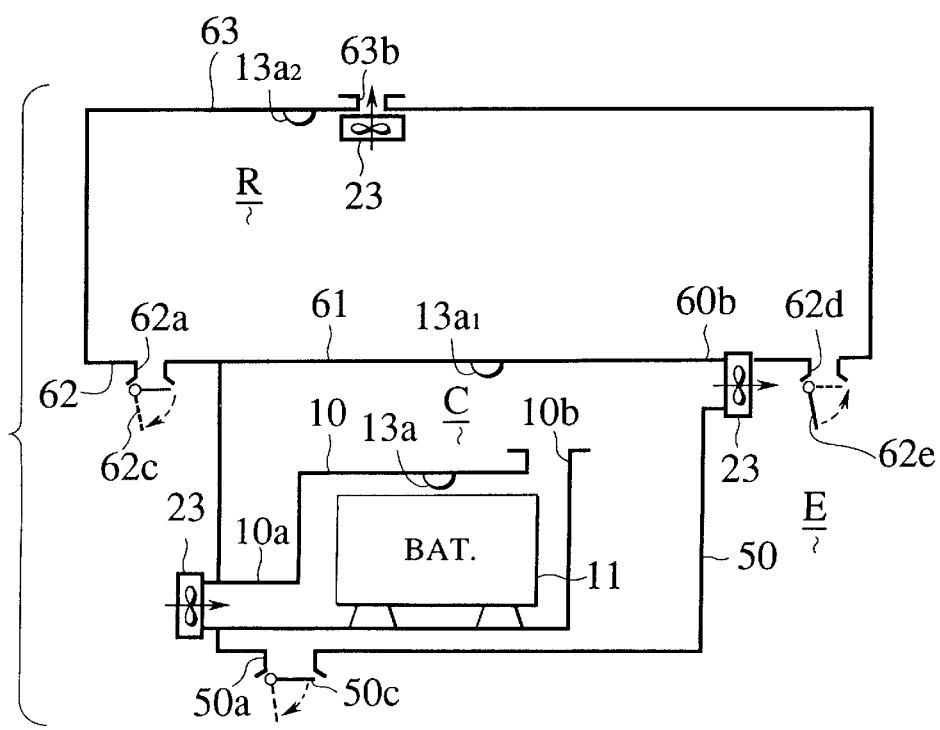

As in FIGS. 7A–7B, hydrogen sensors 13a1, 13a2 (identical to the sensor 13a) are provided in top central regions of the chamber C and the passenger room R, respectively. The carrier 50 has an air inlet 50a at a front part of a bottom wall thereof, which inlet 50a may be provided with a normally close valve 50c to be open for an enhanced ventilation to expel hydrogen gas from the carrier 50. A front lower wall 52 (FIG. 7A) of the passenger room R may be formed with an air inlet 52a communicating with an open space E (FIG. 7A), and may have a normally open valve 52c controlled to be close when the fan 23 is driven. A floor 62 (FIG. 7B) of the passenger room R may have a pair of front and rear air inlets 62a, 62d opening in front and behind the carrier 50 to communicate with an open space E (FIG. 7B), respectively. These air inlets 62a, 62d may have normally close and normally open valves 62c, 62e, respectively, controlled to be open and close when the fan 23 is driven, respectively.

In the foregoing embodiments, necessary detection signals are input to a CPU or the ECU 15, and necessary control signals are output from the CPU or ECU 15.

Further, the battery 11 is accommodated in a space defined by a dedicated electrolyte container, which space communicates inside the battery enclosure 10, and an enclosed space in the enclosure 10 normally or sometimes communicates with the carrier chamber C, open space E and passenger room R through associated ports, openings and gaps.

The battery control systems described each have a charge-discharge controller installed in the ECU 15 for controlling charges and discharges to and from the battery 11, and other controls in the system may be separated and combined to constitute a hydrogen concentration control system for electric automobiles.

While preferred embodiments of the present invention have been described using specific terms, such description is for illustrative purposes, and it is to be understood that changes and variations may be made without departing from the spirit or scope of the following claims.

What is claimed is:

1. A battery control system for electric automobiles, comprising:
   a detector for detecting a concentration of hydrogen gas in an enclosure in flow communication with an accommodation space for accommodating a battery for driving an electric automobile;
   an expeller for expelling hydrogen gas from the enclosure;
   an alarm provider for providing an alarm;
   a battery deterioration determination mechanism for determining a deterioration condition of the battery; and
   at least one controller,
      wherein said at least one controller provides a first control signal for driving the expeller when the detector detects a hydrogen gas concentration greater than a first predetermined concentration, provides a second control signal for driving the alarm provider when the detector detects a hydrogen gas concentration greater than a second predetermined concentration which is greater than the first predetermined concentration, and provides a third control signal to drive the expeller when the battery deterioration determination mechanism determines a deterioration condition of the battery.

2. The battery control system of claim 1, wherein said at least one controller further provides a cancellation control signal for canceling the first and second control signals when the detector detects a hydrogen gas concentration lower than a third predetermined concentration which is lower than the first predetermined concentration.

3. The battery control system of claim 1, further comprising a memory for storing a record of the alarm in response to the second control signal.

4. The battery control system of claim 3, wherein the at least one controller checks the memory for a stored record of the alarm when an ignition key of the electric automobile is operated and responds to the stored record to provide the second control signal.

5. The battery control system of claim 1, wherein the expeller includes an anti-explosive fan installed in the enclosure.

6. The battery control system of claim 1, wherein the expeller includes a fan installed outside the accommodation space.

7. The battery control system of claim 1, wherein the expeller includes a fan operative for air-cooling the battery.

8. The battery control system of claim 1, further comprising:
   a charge system for charging the battery; and
   a controller for controlling the charge system to prevent over-charging the battery.

9. The battery control system of claim 1, wherein the battery deterioration determination mechanism includes a charge frequency counter.

10. The battery control system of claim 9, wherein the charge frequency counter counts a number of charge-to-discharge cycles experienced by the battery.

11. The battery control system of claim 9, wherein the charge frequency counter includes at least one of a current sensor to detect changes in polarity or direction of current and a voltage sensor to detect changes in potential difference.

12. A hydrogen concentration control system for electric automobiles, comprising:
   a detector for detecting a concentration of hydrogen gas in an enclosure in flow communication with an accommodation space for accommodating a battery for driving an electric automobile;
   an expeller for expelling hydrogen gas from the enclosure;
   an alarm provider for providing an alarm;
   a battery deterioration determination mechanism for determining a deterioration condition of the battery; and
   at least one controller,
     wherein said at least one controller provides a first control signal for driving the expeller when the detector detects a hydrogen gas concentration greater than a first predetermined concentration, provides a second control signal for driving the alarm provider when the detector detects a hydrogen gas concentration greater than a second predetermined concentration which is greater than the first predetermined concentration, and provides a third control signal to drive the expeller when the battery deterioration determination mechanism determines a deterioration condition of the battery.

13. The hydrogen concentration control system of claim 12, wherein the battery deterioration determination mechanism includes a charge frequency counter.

14. The hydrogen concentration control system of claim 13, wherein the charge frequency counter counts a number of charge-to-discharge cycles experienced by the battery.

15. The hydrogen concentration control system of claim 13, wherein the charge frequency counter includes at least one of a current sensor to detect changes in polarity or direction of current and a voltage sensor to detect changes in potential difference.

* * * * *